Patented Feb. 6, 1923.

1,444,162

UNITED STATES PATENT OFFICE.

MILTON F. BEECHER AND MACDONALD C. BOOZE, OF WORCESTER, MASSACHUSETETS, ASSIGNORS TO NORTON COMPANY, OF WORCESTER, MASSACHUSETTS, A CORPORATION OF MASSACHUSETTS.

CERAMIC BONDED CARBIDE ARTICLE AND METHOD OF MAKING SAME.

No Drawing. Application filed August 9, 1921, Serial No. 491,058. Renewed May 9, 1922. Serial No. 559,571.

*To all whom it may concern:*

Be it known that we, MILTON F. BEECHER and MACDONALD C. BOOZE, citizens of the United States of America, residing at Worcester, in the county of Worcester and State of Massachusetts, have invented certain new and useful Improvements in Ceramic Bonded Carbide Articles and Methods of Making Same, of which the following is a full, clear, and exact specification.

This invention relates to the manufacture of ceramic articles and more particularly to articles of granular refractory and abrasive carbides bonded by ceramic matrices, and a method of making the same.

In the usual manufacture of articles made of refractory and abrasive carbides bonded by ceramic materials, such as silicon carbide bricks and grinding wheels, it is customary to shape the green article of silicon carbide grains mixed with a plastic clay bond and then fire this relatively fragile and soft mass in a periodic kiln at a temperature approximately 1300° C. to vitrify the bond. These green articles must be carefully protected, hence they are commonly packed in saggers and preferably supported on or surrounded by crushed quartz. Such kilns are commonly coal fired and it has been customary to use an excess of air over that required for combustion of the fuel, thus maintaining an oxidizing atmosphere in the kiln. Due to the air contained in the sagger and the considerable circulation of the heating gases around the article, this oxidizing condition prevails during the vital period of the burn.

It is observed that there is a tendency for two zones to be formed in the fired product, an outer zone of a lighter color which appears to be the result of some chemical reaction and the inner zone of a darker color which has apparently remained unaffected. Such an article is known as a cored product and is not desirable commercially owing to the difference in physical characteristics of the two zones. For example, the inner cored portion may be slightly softer than the outer layer, as evidenced by a difference in their grinding characteristics.

We have also observed that the depth to which the effect of this reaction penetrates the article will vary according to the conditions of firing, the degree of protection in the setting, and the structure of the article itself. In the case of a very porous product or of a thin article, there may be no inner unchanged portion, but the whole article may be like the outer zone of a cored product. Heretofore, the effort has been to cause this reaction to carry on to completion throughout the body, since the article, whatever its physical properties, would at least be uniform in structure; but it has been considered impossible to make such an article of any considerable thickness or of a dense structure without a core being formed.

We have concluded as the result of our observations and study that this coring is the result of a superficial oxidation of certain ingredients of the silicon carbide article and that the inner zone remains unoxidized because the furnace gases do not penetrate to the center unless the article is thin or of a porous texture. We have also found that it is desirable to obtain an article which has the structure of the inner cored portion throughout.

It is accordingly an object of our invention to provide a method of making ceramic bonded refractory and abrasive carbide articles and of so protecting the ingredients thereof during firing as to eliminate the formation of zones of different characteristics, irrespective of the dimensions and density of the mass, and to produce a bonded article of substantially uniform properties throughout. Further objects will be apparent in the following disclosure.

In the course of our experimentation, we have discovered that the coring of ware made of bonded grains of such carbides may be prevented and a structure of uniform character obtained by firing the ceramic ware in the presence of a non-oxidizing or a reducing atmosphere, thus preventing the oxidation of the material in the outer layer of the article and maintaining this outer zone in the same condition as the inner zone.

To this end, we may so regulate the combustion of the fuel in the kiln as to provide a reducing atmosphere, and in kilns of the type in which the furnace gases do not come in contact with the goods we may introduce either a reducing or an inert gas into the chamber surrounding the article. If we employ a tunnel kiln and particularly one of the muffle type in which the ware is protected from the gases of combustion, we may subject the ware to a zonal treatment according to which it will be feasible to introduce the inert or reducing atmosphere only into the hotter portion of the kiln where the carbide is most likely to be affected. In the periodic type of kiln, as well as the tunnel kiln, we have found that it is particularly feasible to surround each individual article with a reducing medium without changing the furnacing or otherwise interfering with the usual kiln practice. This may be accomplished by surrounding the ware with carbonaceous material which will provide a reducing atmosphere, and preferably with powdered graphite which is found to be slow to burn so that a small amount will last throughout the entire kiln firing operation. Various other materials, such as silicon carbide mixed with graphite, will readily suggest themselves for this purpose, the use of which will be determined by their properties and the relation which they bear to the kiln furnacing conditions.

While our invention is applicable to the bonding and firing of other refractory and abrasive carbides similar to silicon carbide, such as boron carbide or titanium carbide, it is deemed sufficient to describe it with reference to silicon carbide only, but the term carbide as used herein is to be understood as embracing the other refractory and abrasive carbides of this class. As a specific example of the adaptation of it to the manufacture of ceramic bonded silicon carbide articles, we may adopt the following procedure. A mixture of silicon carbide grains with the required clay bonding ingredients and water is first prepared, and formed to the shape and dimensions of the article desired as is well known in this art. A layer of granular graphite or other reducing material, either alone or mixed with inert materials, such as quartz, is then placed in the bottom of a refractory container, such as a fire clay sagger, and levelled off to provide a proper support for the green ceramic ware. One or more of the articles shaped from the silicon carbide mixture may then be set into the sagger and preferably a thin layer of the reducing medium should be spread between and over them. The sagger as thus loaded is ready to be placed in the furnace or kiln and the mass fired according to the usual ceramic practice in this art to mature the bond. As a further aid for protecting the ware, we preferably employ saggers or fire clay rings which have walls rendered impervious to gases, as by glazing. Also the cracks and chinks may be filled with a lute of plastic clay to keep out the furnace gases.

It is found that during the firing operation, which is carried to relatively high temperatures and held at the highest point (about 1300° C.) for a considerable period of time, only a small amount of the graphite of the setting mixture is oxidized. Such oxidation is, however, sufficient to remove enough of the free oxygen contained in the pore spaces of the ware and the setting material and any oxidizing kiln gases that filter in through the sagger to prevent any appreciable oxidation of the article.

It might also be stated that two intersecting phenomena have been observed in connection with coring. One is that in the unoxidized portion of a silicon carbide article the bond has been found more uniformly distributed over the grains and less granular or concretionary than is common in the oxidized portion. This more uniform coating of the grain permits the color of the grain itself to show through the bond and makes the cored portion darker appearing. The other observation is that finely divided carbon (possibly graphite) is sometimes found in the inner zone of a cored article. This carbon may likewise appear in an article made according to our invention. It is not understood what effect a reducing atmosphere has on the carbide granule, but we consider that it prevents oxidation of the granule as well as any impurities, such as carbon, which may be present. However, accurate observation of what takes place in the manufacture of these carbide articles is difficult at the temperatures involved in the kiln firing operation. For this reason no clearly defined theory has yet been evolved as to what reactions occur and in fact any theory which might be advanced at this time would remain unsubstantiated by actual observations. It therefore is to be understood that this invention is not to be limited to any particular theory which may be advanced to explain the various phenomena observed.

Having thus described our invention, what we claim as new and desire to secure by Letters Patent is:

1. The method of making a bonded carbide article comprising the steps of forming a mixture of carbide granules with a ceramic bond and firing the mass to mature the bond in the presence of a medium capable of substantially preventing oxidation of the ingredients of the article.

2. The method of making a bonded carbide article comprising the steps of forming a mixture of a carbide and a vitrifiable ceramic bond, firing it to vitrify the bond and maintaining non-oxidizing conditions around the mixture during the firing operation.

3. The method of making a bonded carbide article which comprises the steps of forming an unfired mass of carbide grains intimately mixed with a ceramic bonding material, firing the mass to mature the bond and maintaining a reducing atmosphere in its presence during the higher ranges of temperature.

4. The method of making a carbide article comprising the steps of shaping a mixture of carbide granules and a ceramic bond, packing the article in refractory, reducing, carbonaceous material and firing the article to mature the bond.

5. The method of making a ceramic bonded silicon carbide article comprising the steps of shaping the article from a mixture of silicon carbide and a ceramic bond, surrounding the article in a ceramic kiln with material capable of preventing oxidation of the silicon carbide at the higher ranges of the kiln temperature and firing it under such conditions as to mature the bond.

6. The method of making a bonded silicon carbide article comprising the steps of shaping a mass of silicon carbide grains and a vitrifiable bond, surrounding said article with a reducing substance which will react with oxygen present to produce a non-oxidizing atmosphere and firing the mass while thus protected to vitrify the bond.

7. The method of making an article containing silicon carbide comprising the steps of mixing silicon carbide grains with a vitrifiable ceramic bond, shaping an article therefrom, surrounding the article with a carbonaceous granular material which will prevent oxidation and firing the article to mature the bond.

8. The method of making a ceramic bonded silicon carbide article comprising the steps of forming a mixture of silicon carbide and a vitrifiable ceramic bond, surrounding the same with a granular, reducing, carbonaceous material and firing the mixture in the presence of such material to vitrify the bond.

9. The method of making a bonded silicon carbide article comprising the steps of shaping the article from a mixture of silicon carbide grains and a vitrifiable ceramic bond, embedding the article in a granular material containing graphite and firing it to vitrify the bond.

10. The method of making a bonded silicon carbide article comprising the steps of shaping a plastic mixture of granular silicon carbide and a vitrifiable ceramic bond, packing the shaped article in granular graphite, firing the article to vitrify the bond and excluding the presence of oxidizing furnace gases therefrom during the period of firing at the higher ranges of temperature.

11. An article of manufacture comprising a mass of carbide grains bonded by a matured ceramic bond, the mass containing material in its surface layer which would normally be oxidized if initially fired in an oxidizing atmosphere and having substantially uniform color and structural characteristics throughout.

12. An article of manufacture comprising a dense and massive body of unoxidized silicon carbide grains intimately bonded by a vitrified ceramic material, said body containing carbonaceous material which would normally be oxidized if initially fired in an oxidizing atmosphere and being of substantially uniform color and structure throughout.

Signed at Worcester, Massachusetts, this 8th day of Aug., 1921.

MILTON F. BEECHER.
MACDONALD C. BOOZE.